May 29, 1928. 1,671,216
H. S. ASHENHURST
CELLULAR BUILDING BLOCK
Filed Aug. 7, 1924
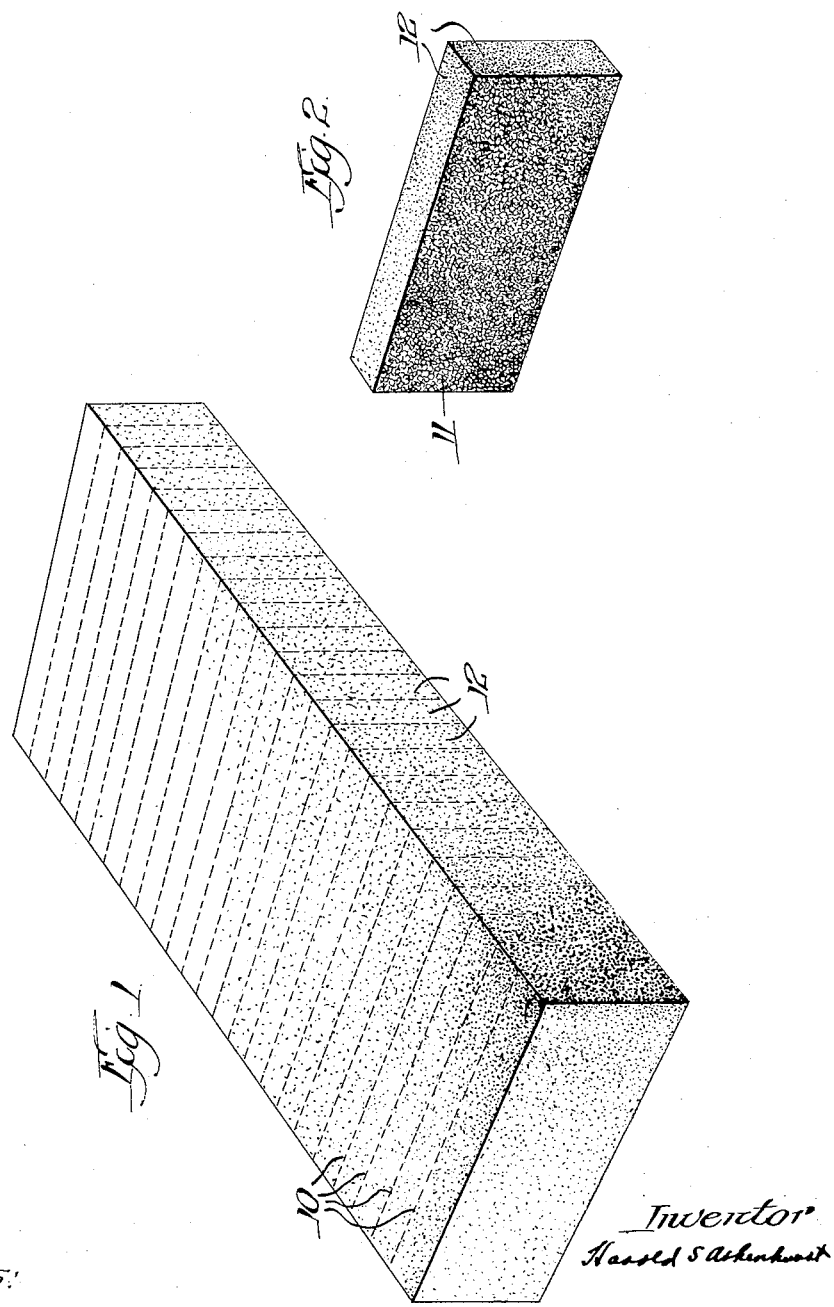

Patented May 29, 1928.

1,671,216

UNITED STATES PATENT OFFICE.

HAROLD S. ASHENHURST, OF CHICAGO, ILLINOIS, ASSIGNOR, BY MESNE ASSIGNMENTS, TO INSULEX CORPORATION, OF CHICAGO, ILLINOIS, A CORPORATION OF DELAWARE.

CELLULAR BUILDING BLOCK.

Application filed August 7, 1924. Serial No. 730,720.

My invention relates to blocks adapted for use in building, and particularly to a cellular block having novel characteristics.

The use of blocks composed of cementitious material for the formation of walls, particularly inside walls, is common in the art and an object of my invention is to provide a block of the character described which may be cheaply constructed and of relatively very light weight.

One of the particular objects of my invention is to provide a block, a surface of which is so formed as to provide a perfect bond with the plaster applied thereto. The material which I prefer to utilize in the making of the blocks is gypsum, or any similar substance which will set, and particularly the material as set forth and claimed in my Reissue Patent No. 15,952 of November 25, 1924. Combined with the gypsum are materials capable of independent reaction whereby a gas is formed during the period prior to setting of the gypsum. The resultant structure as produced in accordance with my said prior patent is distinctly cellular throughout, the size and number of the cells and the thickness of the material surrounding the cells being readily controlled by proportioning the gas-forming materials. It is to be highly recommended that materials for producing the gas-forming reaction be inert relative to the major constituent such as gypsum; this, for the reason that if such materials do react with the gypsum, the resultant structure will be weakened. Furthermore, it is desirable that the materials employed be such that the resultant products shall be insoluble. By employing gypsum as the major ingredient, together with aluminum sulphate, calcium carbonate, a colloid such as contained in the materials manufactured from packing house waste and commercially sold as retarders and water, a reaction takes place which provides the desirable qualities mentioned. Upon the addition of water, the aluminum sulphate enters into solution and releases sulphuric acid; the acid reacts with the water-insoluble calcium carbonate, forming calcium sulphate and releasing carbon dioxide. The reaction with the aluminum sulphate results in aluminum hydroxide, an intermediate product, and, under the action of heat, aluminum oxide. All these products are insoluble in water.

The structure being cellular in character throughout, a block formed of such materials and arranged so as to expose the cells provides an ideal plaster surface, inasmuch as the plaster may be keyed thereto, due to the entrance of plaster into the multitude of irregular recesses at the surface. Moreover, by reason of the fact that the cells are largely complete in themselves and segregated and walled off largely from each other, it follows that the mass formed of material which is water-insoluble in its final form is substantially non-absorbent, whereby it is effective for bonding with plaster without objectionable tendency to absorb from the plaster the water necessary for its proper setting and hardening. The desired result may be secured by forming the material in a large block and sawing the block into smaller unit, or the cells may be exposed in other manners such as by abrading the surface. The material composing the exterior surface of the block will be relatively dense in character. This relative density of the face portion of the block is not claimed by this application but forms a part of the subject-matter claimed by my co-pending application, Serial No. 736,892, filed September 10, 1924, and the later application covering the process, Serial No. 12,883, filed March 3, 1925, such applications disclosing the employment of special steps for developing such surface density.

The invention will be more readily understood by reference to the accompanying drawing, wherein, Fig. 1 is a perspective view of a large block which may be cast by any desirable method or means, and, Fig. 2 is a perspective view of one of the finished blocks of my invention.

In producing the blocks of my invention, I may employ the process and apparatus disclosed in my co-pending application, Serial No. 730,721, filed August 7, 1924. As disclosed in that application, the block will preferably be of rectangular form, having a depth and transverse width corresponding to that of the finished block. The length of the block may be determined according to the number of units to be formed therefrom. The large block is cast and allowed to expand and set, the mold removed, and the mass of cellular material brought into contact with saws which divide it along the lines 10, in Fig. 1. The resultant product is indicated at 11, in Fig. 2, and consists of a section of cellular material, the side edges 12 of which are preferably smooth and of relatively dense material. The body is composed of cells, one or both side faces of the block exposing the cells that are broken or transversely divided. This provides an ideal surface for the reception of plaster.

I do not desire to be limited to the use of any specific combination or proportions of ingredients for the formation of my improved block. I have, however, obtained very good results in accordance with my said prior patent by the use of a mixture of the following proportions,—100 pounds of calcined gypsum, 2 ounces of commercial retarder, 3¾ pounds of a suitable carbonate such as calcium carbonate, and 8 pounds of aluminum sulphate containing its water of crystallization, all of such ingredients being finely ground and thoroughly mixed in a dry state.

While I have illustrated and described a block which is rectangular in form, it will be understood that the invention is not thus limited. Other shapes may be produced with the same advantageous results. The scope of the invention is indicated in the appended claims.

I claim:

1. A unit block for a wall, made up principally of body material of cellular formation throughout and having at least one face defined by cell depressions separated from each other only by the cell walls and provided by the removal of the outer portions of the cells.

2. A unit block for a wall, made up principally of body material of cellular formation throughout in which the individual cells are largely walled off completely from the adjacent cells, said block having at least one face marked substantially throughout by shallow cell depressions separated from each other only by the cell walls and provided by the removal of the outer portions of the cells.

Signed at Chicago, Illinois, this 4th day of August, 1924.

HAROLD S. ASHENHURST.